(12) United States Patent
Marquant et al.

(10) Patent No.: US 8,155,192 B2
(45) Date of Patent: Apr. 10, 2012

(54) SCALABLE ENCODING AND DECODING OF INTERLACED DIGITAL VIDEO DATA

(75) Inventors: Gwenaelle Marquant, La Chapelle Chaussée (FR); Guillaume Boisson, Rennes (FR); Edouard Francois, Bourg des Comptes (FR); Jérôme Vieron, Bédée (FR); Philippe Robert, Thorigné-Fouillard (FR); Christine Guillemot, Chantepie (FR)

(73) Assignee: Thomson Licensing, Boulogne-Billancourt (FR)

( * ) Notice: Subject to any disclaimer, the term of this patent is extended or adjusted under 35 U.S.C. 154(b) by 1544 days.

(21) Appl. No.: 10/546,791

(22) PCT Filed: Feb. 20, 2004

(86) PCT No.: PCT/EP2004/001658
§ 371 (c)(1),
(2), (4) Date: Nov. 13, 2006

(87) PCT Pub. No.: WO2004/080079
PCT Pub. Date: Sep. 16, 2004

(65) Prior Publication Data
US 2007/0147492 A1    Jun. 28, 2007

(30) Foreign Application Priority Data

Mar. 3, 2003   (EP) .................................... 03290507

(51) Int. Cl.
*H04N 7/12* (2006.01)
(52) U.S. Cl. ............. 375/240.16; 375/240.1; 375/240.29
(58) Field of Classification Search ............... 375/210.08
See application file for complete search history.

(56) References Cited

U.S. PATENT DOCUMENTS

| 5,742,343 | A  | * | 4/1998  | Haskell et al. .......... 375/240.15 |
| 6,392,705 | B1 |   | 5/2002  | Chaddha                             |
| 6,961,383 | B1 | * | 11/2005 | Reibman et al. ......... 375/240.25 |

(Continued)

FOREIGN PATENT DOCUMENTS

| EP | 0579395 | 1/1994  |
| EP | 0596423 | 5/1994  |
| EP | 0881835 | 12/1998 |

OTHER PUBLICATIONS

Frank Bosveld, 3D subband Decompositions for Hierarchical Video Coding, Nov. 11, 1991, SPIE vol. 1605 Visual Communications and Image Processing '91: Visual Communication, p. 769-780.*

(Continued)

*Primary Examiner* — Jay Patel
*Assistant Examiner* — Jessica Prince
(74) *Attorney, Agent, or Firm* — Robert D. Shedd; Paul P. Kiel; Guy H. Eriksen

(57) ABSTRACT

Fully scalable encoder and decoder for interlaced video. A method for encoding an interlaced sequence of digital video data decomposes the interlaced video sequence into first and second fields, performs digital filtering to get lower frequency and higher frequency component signals of the first fields, and uses spatio-temporal filtering and motion estimation for generating base layer signals being suitable for reconstruction of a progressive mode video sequence in a receiver. Advantageously, both the spatio-temporal filter at the encoder, and the inverse process at the receiver, can perform scaling in spatial and temporal dimension. The second fields are used to generate enhancement signals, which enable a receiver to reproduce an interlaced video sequence of the full, or scaled, spatial and/or temporal resolution.

2 Claims, 2 Drawing Sheets

U.S. PATENT DOCUMENTS

| | | | | |
|---|---|---|---|---|
| 7,042,946 B2* | 5/2006 | Turaga et al. | ............ | 375/240.19 |
| 7,321,625 B2* | 1/2008 | Zhang et al. | ............ | 375/240.11 |
| 7,627,040 B2* | 12/2009 | Woods et al. | ............ | 375/240.26 |
| 2002/0154697 A1* | 10/2002 | Jeon | ............ | 375/240.16 |
| 2004/0057624 A1* | 3/2004 | Wells | ............ | 382/233 |

OTHER PUBLICATIONS

P. Delogne: "Compatible Coding of Digital Interlaced HDTV", IEEE Journal on Selected Areas in Communications, IEEE Inc. NY US, vol. 11, No. 1, 1993, pp. 146-151.

Puri Atul et al. "Scalable Video Coding in Spatial Domain" Proceedings of the Picture Doding Symposium, Mar. 17-19, 1993, pp. 19.1A-19.1B.

F. Bosveld et al.: "3D Subband Decompositions for Hierarchical Video Coding" Visual Communication and Image Processing '91: visual communication, boston, Nov. 11-13, 1991, Proceedings of SPIE, vol. 2, vol. 1605, Nov. 11, 1991, pp. 769-780.

Search Report Dated Jun. 8, 2004.

* cited by examiner

SCALABLE ENCODING AND DECODING OF INTERLACED DIGITAL VIDEO DATA

This application claims the benefit, under 35 U.S.C. §365 of International Application PCT/EP04/001658, filed Feb. 20, 2004, which was published in accordance with PCT Article 21(2) on Sep. 16, 2004 in English and which claims the benefit of European patent application No. 03290507.7, filed Mar. 3, 2003.

FIELD OF THE INVENTION

This invention relates to a method for video compressing. More particularly, it relates to a method for achieving scalability when encoding and decoding an interlaced sequence of digital video data.

BACKGROUND

Today most video coding algorithms use motion compensated predictive coding for reduction of transmission bandwidth. In such hybrid schemes, temporal redundancy is reduced using motion compensation, and spatial redundancy is reduced by motion compensation residual transform coding. While most standard definition (SD) video material, including available MPEG video material for test purpose, is interlaced, recent research in scalable video coding has concentrated on evaluation of progressive video only. Efforts in this respect are encouraged e.g. for MPEG-4 as mentioned in "Description of, Exploration experiments in Scalable Video Coding", ISO/IEC JEC1/SC29/WG11, MPEG2002/N5414, Awaji, December 2002. Known algorithms, e.g. as disclosed in WO9003082 for HDTV, are not sufficient for transmission of spatially and temporally scalable, interlaced video, because a wider range of scalability is demanded. New display types, e.g. miniature mobile displays, get by with progressive video sequences of low spatial and temporal resolution, while others, e.g. HDTV receivers, require interlaced sequences with high spatial resolution and standard temporal resolution.

SUMMARY OF THE INVENTION

The purpose of the invention is an improvement of subband or wavelet coding of interlaced video. Since in interlaced video the spatial and temporal dimensions are tightly coupled, the inventive method uses additional exploration in the context of spatio-temporal signal-noise-ratio (SNR).

The problem to be solved by the invention is to provide a method for full spatial and temporal scalability in coding and decoding of interlaced video. It can covert the received signal to video sequences at different levels of temporal resolution, either progressive or interlaced, and at various levels of spatial resolution.

According to the invention, interlaced digital video data are processed in a way that supports spatial, temporal and quality scalability, quality with respect to SNR, namely by adequate splitting operations and spatio-temporal filtering, leading to the generation of scalable spatial and/or temporal sub-resolution sequences.

This is achieved by partitioning, or decomposing, the interlaced source video material into two layers, namely a base layer (BL) and an enhancement layer (EL). The BL contains a fully scalable description of the input video source in progressive mode, wherein scalability refers to spatial resolution, temporal resolution and quality. The EL, when combined with the BL, allows a low-cost, scalable reconstruction of the original interlaced video material, including the achievement of original spatial resolution, temporal resolution and SNR quality.

This decomposition may be achieved by associating every other field of the interlaced video sequence to the same layer, e.g. one layer processes even fields and the other layer processes odd fields. Advantageously, it is possible to save computing power by using motion estimation (ME) vectors from the BL for parts of EL processing. The interlaced video sequence is decomposed into five components, belonging to the two layers BL and EL. A receiver according to the invention can combine the components to video sequences of various quality levels, with respect to spatio-temporal resolution and SNR.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a video coder for scalable coding according to the invention.

DETAILED DESCRIPTION OF THE INVENTION

Figure 1:
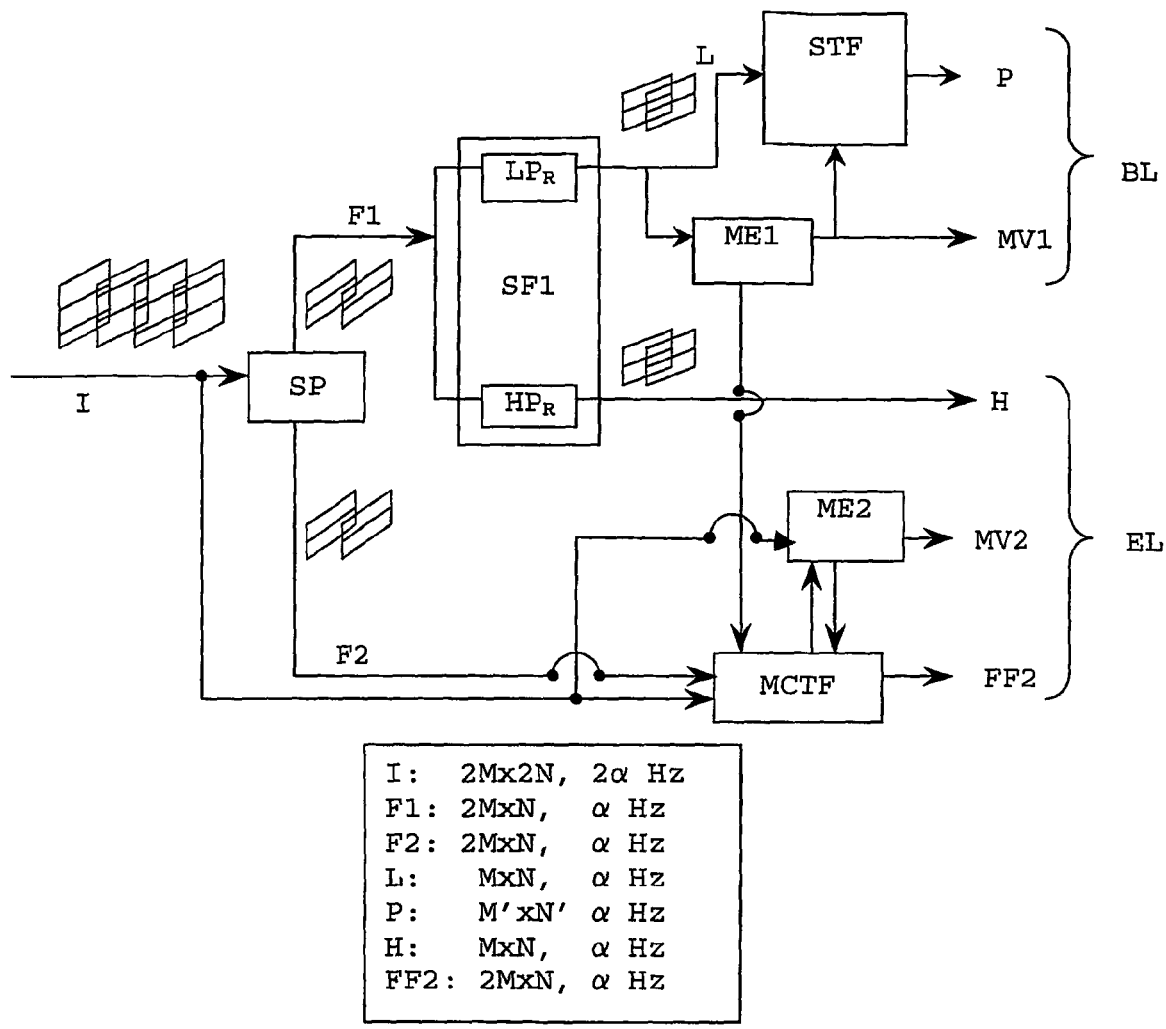

FIG. 1 shows the structure of a video coder according to the invention. The input signal I is an interlaced video sequence with a temporal resolution of $2\alpha$ Hz, i.e. $2\alpha$ fields per second or $\alpha$ frames per second, and a spatial resolution of $2M \times 2N$, i.e. a frame having $2N$ rows with $2M$ pixels each, or a field having $N$ rows with $2M$ pixels each. A splitting block SP distributes the sequence such that the fields are passed in an alternating manner to a first or a second branch. The first branch generates BL information and EL information, but will be referred to herein as BL branch. The other branch generates only EL information and will be referred to herein as EL branch. Each branch receives a video sequence with a temporal resolution of $\alpha$ frames per second and a spatial resolution of $2M \times N$ pixels. E.g., the BL sequence F1 contains even fields and the EL sequence contains odd fields. Generally, the splitting block SP executes any splitting transformation, producing two descriptions from a single source description. It may also utilize various filters for more sophisticated processing, e.g. low/high filtering.

The BL branch performs spatial filtering SF1 on the F1 sequence along the x-axis, i.e. within lines, and generates from the lower frequency portions of F1 a video sequence L with a spatial resolution of $M \times N$ pixels, and from the higher frequency portions of F1 a spatial resolution enhancement signal H. In a simple example the filtering can be performed by a low pass filter $LP_{row}$ and a high pass filter $HP_{row}$, both performing horizontal subsampling of e.g. factor 2. Other factors may also appear useful. The low-resolution sequence L is input to a spatio-temporal filter STF and to a Motion Estimating (ME) block ME1. The spatio-temporal filter STP performs motion compensated temporal transformation, also being called 3D wavelet transform or 2D+t wavelet transform. It may be implemented e.g. as Haar transform filter of length 2, or Daubechies filter of length 9 and 7, or length 5 and 3. The ME block ME1 generates motion vectors MV1, which serve three purposes: first they are used to optimize the spatio-temporal filtering process, second they are transmitted to the receiver to be used e.g. for the inverse filtering process, and third they will be used in the EL branch of the coder.

The output signal P of the spatio-temporal filter STF is transmitted, and can be combined with the motion vectors MV1 by a receiver to reproduce e.g. an M×N pixel, α Hz progressive mode video sequence. Advantageously, when using the above mentioned implementation it is also possible to design the spatio-temporal filter such that this progressive sequence is scalable with respect to temporal resolution and to spatial resolution in both x and y direction. The filter may contain several filtering levels, depending on the target frame rate or format, so that e.g. a spatial resolution of M'×N' and/or a temporal resolution of θα Hz can be achieved, with M' and N' ranging in [0,M] [0,N] and $\theta \in Q_{01}$, $Q_{01}$ being the rational numbers ranging in [0, 1]. This filtering can deliver different spatio-temporal frequencies whose fittings, e.g. organization within the data stream, make the base layer fully scalable. The output P of this block STF is a progressive sequence with a resolution of M'×N', which is a sub-resolution of the original 2M×2N format, and it represents the lowest spatial and temporal resolution level the inventive system generates.

The spatial resolution enhancement signal H, containing the high frequency fields along the x-axis, belongs to the enhancement layer EL, and can be used by advanced receivers to reconstruct frames with higher spatial resolution in x direction, up to the original resolution.

The EL branch performs Motion Compensated Temporal Filtering (MCTF) on the F2 sequence. It uses motion vectors (MV) in order to minimize the amount of data to be transmitted when an object moves its position in one picture relative to another picture. Two different sets of MVs can be used: either MVs generated from the original interlaced sequence, or MVs generated by comparing fields of same parity, either odd or even. Advantageously, for the latter case the MV1 vectors generated in the ME1 block of the BL branch can be used, since it is very likely that the motion between e.g. two successive even fields is very similar to the motion between the two corresponding odd fields, or vice versa. Still it is possible that motion changes within a sequence of four fields, so that it may be advantageous to use better motion vectors MV2, generated from the interlaced sequence I in a second motion estimation block ME2. Therefore a decision block is integrated in the EL branch in order to decide which set of MVs is to be used for MCTF. It may be advantageous to transmit the decision information.

Motion compensated temporal filtering (MCTF) makes it possible to generate filtered F2 fields FF2, i.e. F2 fields with lower cost than the original F2 fields. These filtered fields FF2 have the same spatial and temporal resolution as the input F2 fields. Cost reduction is achieved by using the described motion vectors, since the amount of transmitted data is reduced. Motion estimation and motion compensation can be performed across fields, independent from parity, in order to capture intra- and inter-fields correlation. Various prediction modes (backward, forward or bi-directional) as well as a multiple reference fields algorithm can be used. In order to reduce MV coding cost and the estimation complexity, motion information from the base layer may be used a priori or a posteriori, depending on the targeted requirements.

For transmission, it will be advantageous to multiplex the resulting streams into one bitstream. The described encoding method decomposes the interlaced original video sequence in two layers, BL and EL, which allows the resulting bitstream to support a variety of spatial and temporal resolution levels, at the coder side as well as at the decoder side. The described EL may also be viewed upon as a plurality of layers, since it contains several levels of resolution.

As a concrete example, the input video sequence I is standard definition (SD) video, with α=30 or 2α Hz being 60 Hz, F1 represents e.g. the even fields and F2 e.g. the odd fields, $LP_{row}$ performs 2:1 subsampling, L is a Common Image Format (CIF) sequence at 30 Hz, and STF is a 1-level spatio-temporal filter, so that P is a CIF sequence at 15 Hz.

Figure 2:
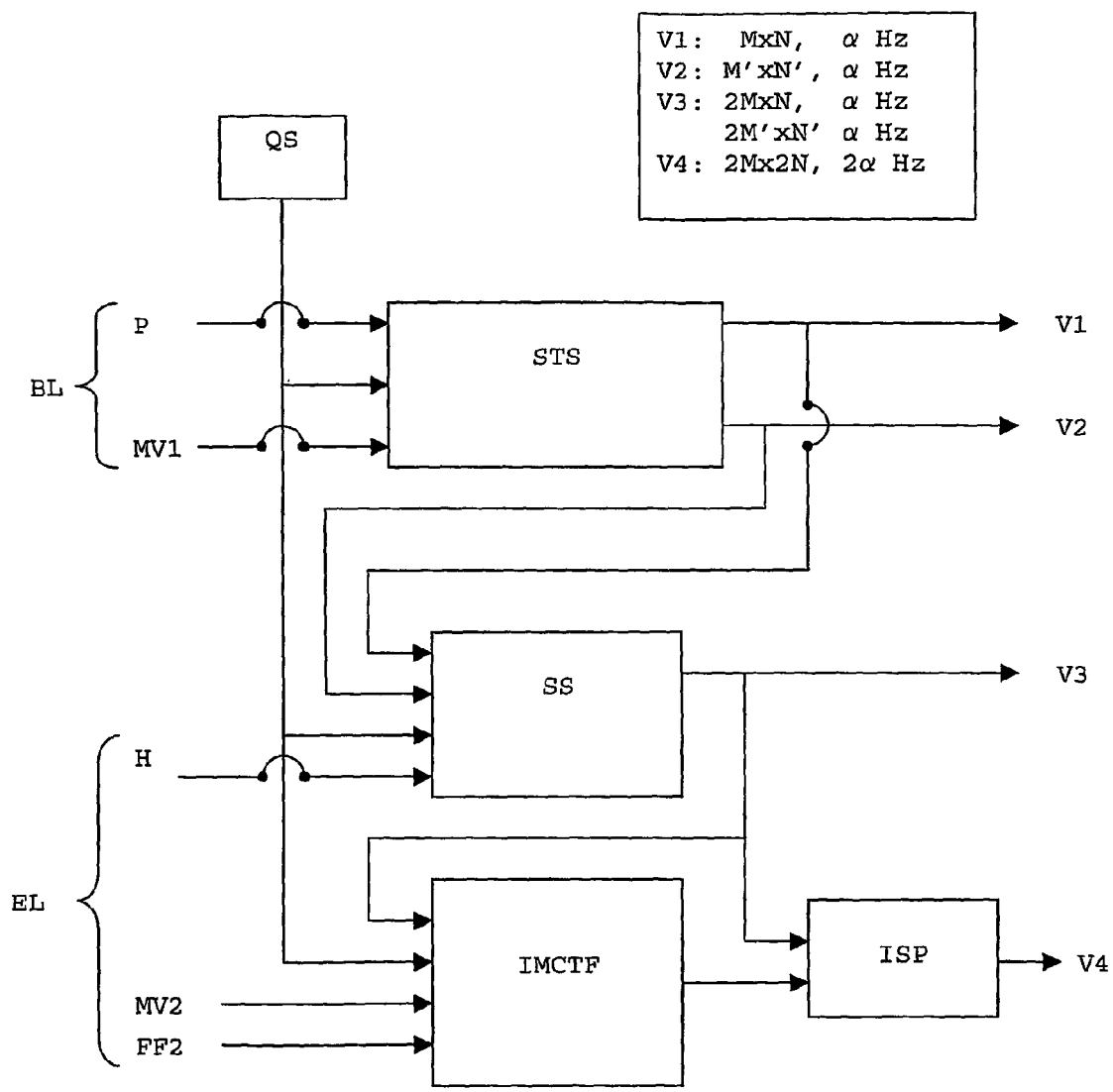
FIG. 2 the structure of a scalable video decoder according to the invention.

At the decoder side, several scenarios have to be considered, depending on the targeted applications: lossless or lossy decoding in progressive or interlaced modes. FIG. 2 shows an exemplary advanced decoder that can generate various quality levels, selectable by technical or user needs. The decoder mode can be selected by a quality selector QS. This can be controlled e.g. by the transmitter or content provider, or the technical capabilities of the receiver, or user preferences. Examples for different modes are lossless or lossy, different field rates, different spatial resolution etc. The decoding process depends on the selected decode quality.

The simplest mode, from the decoder point of view, is progressive lossless mode. In this case only the base layer signals BL, comprising a progressive sequence P and motion vectors MV1, need to be fully decoded. Decoding is performed using a spatio-temporal synthesis STS. In this manner, the reconstructed video sequence V1 has the full spatio-temporal resolutions, i.e. spatial resolution of M×N pixel and temporal resolution of α Hz.

Another mode is the progressive lossy mode. This means that the spatio-temporal resolution of the reconstructed video sequence V2 is a sub-resolution of the resolution achieved in progressive lossless mode V1. The usage of spatio-temporal synthesis STS for decoding makes it possible to reconstruct any M'×N', θ'α Hz progressive sequence, with M' and N' ranging in ]0,M] and ]0,N] and θ' ranging in ]0,1]. Again, only the base layer needs to be decoded.

When the full original interlaced video material shall be reconstructed, i.e. without loss of information, interlaced lossless mode is required. This means that both the entire base layer BL and the enhancement layer EL must be fully decoded. As described for the coder, the EL signals comprise additional data H related to the higher frequencies in x direction of F1 fields, motion vectors MV2 generated from the input interlaced sequence, and information FF2 related to the F2 fields. For proper decoding all the coder operations have to be performed inversely. Inverse filtering is commonly called synthesis. When the respective inverse filtering, which is in this case spatial synthesis SS, is applied to the additional data H and the reconstructed BL signal V1, it produces a video sequence V3, which corresponds to the original F1 sequence at the coder side, of resolution 2M×N and α Hz. Further, the original F2 sequence from the coder side, with same resolution, can be synthesized from the other EL signals FF2 and MV2, by using an inverse motion compensated temporal filter IMCTF. The F1 fields are then merged by an inverse splitting operation ISP with the F2 fields in order to reconstruct the complete interlaced video sequence V4, with the full spatio-temporal resolutions of 2M×2N and 2α Hz, or α interlaced frames per second.

As another possibility, interlaced lossy mode can be used. This means that the reconstructed spatio-temporal resolution is a sub-resolution of the full resolution. As described above for progressive lossy mode, decoding makes it possible to reconstruct any M'×N', θα Hz interlaced sequence. This lossy case means that the base layer or the enhancement layer, or both, are not completely decoded. This may be performed by the spatio-temporal synthesis STS, so that V2 can be used instead of V1 for further processing. It may also be performed by the spatial synthesis SS or the inverse motion compensated temporal filtering IMCTF.

In another embodiment of the invention it is possible to simplify the spatio-temporal filter STF at the coder so that the F1 sequence is directly transmitted. In this case it is also possible to cancel the spatio-temporal synthesis STS at the receiver.

Advantageously the inventive method provides a possibility to generate scalable video, including interlaced video, with the same bitstream being usable for a high resolution interlaced ode TV and a low resolution progressive mode mobile device. Since the bitstream is fully embedded, it is possible to extract all desired spatial or temporal sub-resolutions, at the transmitter as well as at the receiver side.

The inventive method can be used for all video applications, preferably all MPEG compliant systems.

The invention claimed is:

1. A method for decoding a plurality of substreams of a bitstream representing an interlaced sequence of video data, wherein the single substreams are associated with either a base layer or an enhancement layer, the method comprising the steps of extracting from the bitstream those substreams that are associated with the base layer;

performing spatio-temporal synthesis on said substreams, wherein a progressive mode video sequence is generated;

selecting or determining a decode quality being either a basic or an enhanced decode quality, wherein control signals from a transmitter or content provider, technical capabilities at the receiver side and/or user preferences are evaluated;

upon selection of an enhanced decode quality, performing spatial synthesis on said progressive mode video sequence and a substream associated with the enhancement layer, wherein the spatial synthesis generates an enhanced progressive mode video sequence;

performing an inverse motion-compensated temporal filtering on said enhanced progressive mode video sequence and one or more of the substreams being associated with the enhancement layer; and performing inverse splitting on the output of said inverse motion-compensated temporal filtering and said enhanced progressive mode video sequence, wherein an interlaced video sequence of enhanced or full spatio-temporal resolution is generated.

2. An apparatus for decoding a plurality of substreams of a bitstream representing an interlaced sequence of video data, wherein the single substreams are associated with either a base layer or an enhancement layer, comprising spatio-temporal synthesis block for generating from substreams associated with the base layer a progressive mode video sequence of a first resolution;

a quality selector block for selecting or determining a decode quality being either a basic or an enhanced decode quality, wherein control signals from a transmitter or content provider, technical capabilities at the receiver side and/or user preferences are evaluated;

a spatial synthesis block for processing, upon selection of an enhanced decode quality in said quality selector block, said progressive mode video sequence and a substream associated with the enhancement layer, the spatial synthesis block generating an enhanced progressive mode video sequence;

an inverse motion-compensated temporal filtering block for processing said enhanced progressive mode video sequence and one or more of the substreams being associated with the enhancement layer; and an inverse splitting block for processing the output of said inverse motion-compensated temporal filtering block and said enhanced progressive mode video sequence, wherein an interlaced video sequence of enhanced or full spatio-temporal resolution is generated.

* * * * *